Dec. 10, 1957     H. W. SCHMALE     2,815,941
FEED AND GRAIN MIXING MACHINE

Filed July 29, 1955     3 Sheets-Sheet 1

Henry William Schmale
INVENTOR.

BY *Clarence A. O'Brien*
*and Harvey B. Jackson*
Attorneys

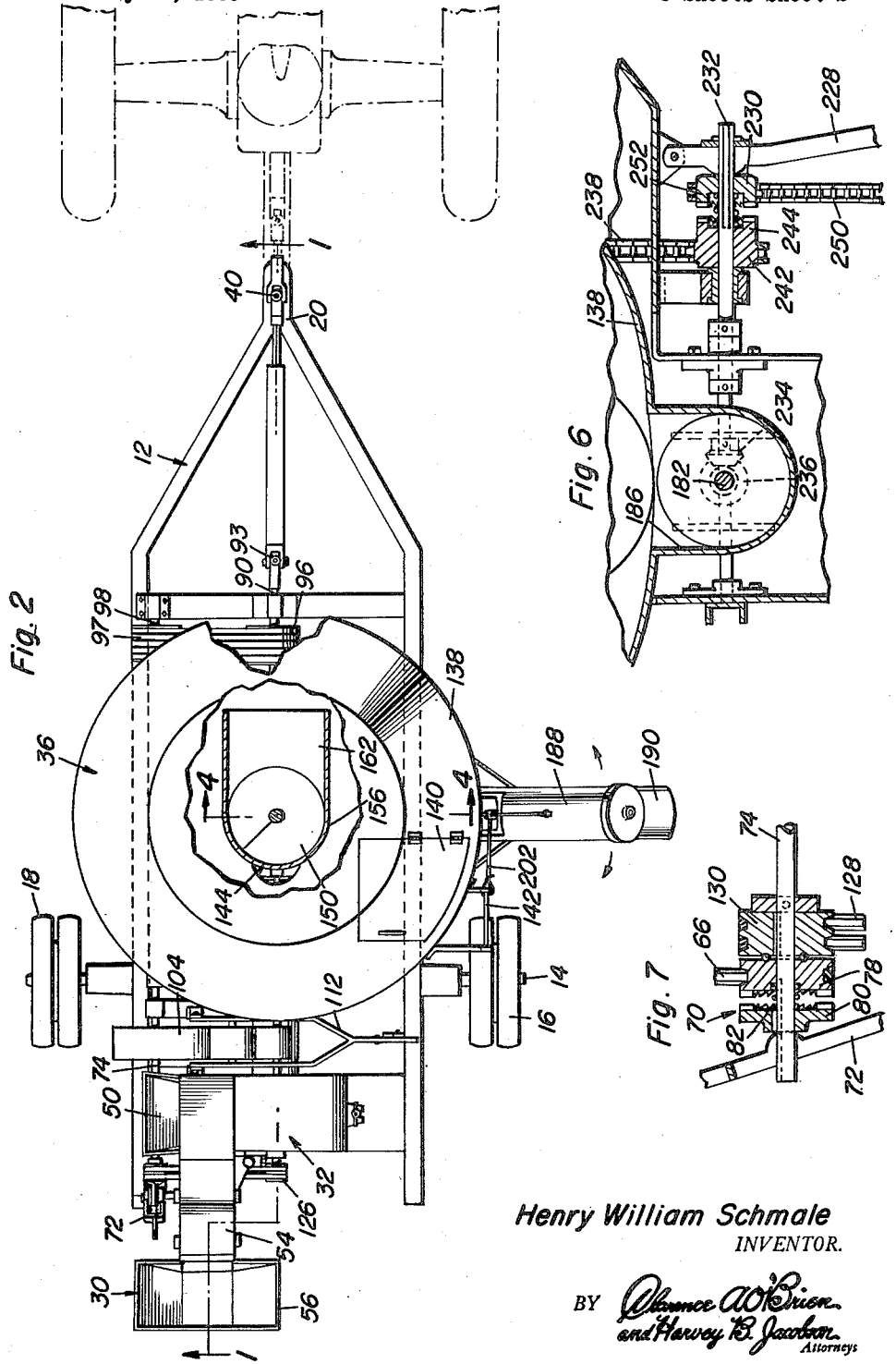

Dec. 10, 1957 H. W. SCHMALE 2,815,941
FEED AND GRAIN MIXING MACHINE
Filed July 29, 1955 3 Sheets-Sheet 3
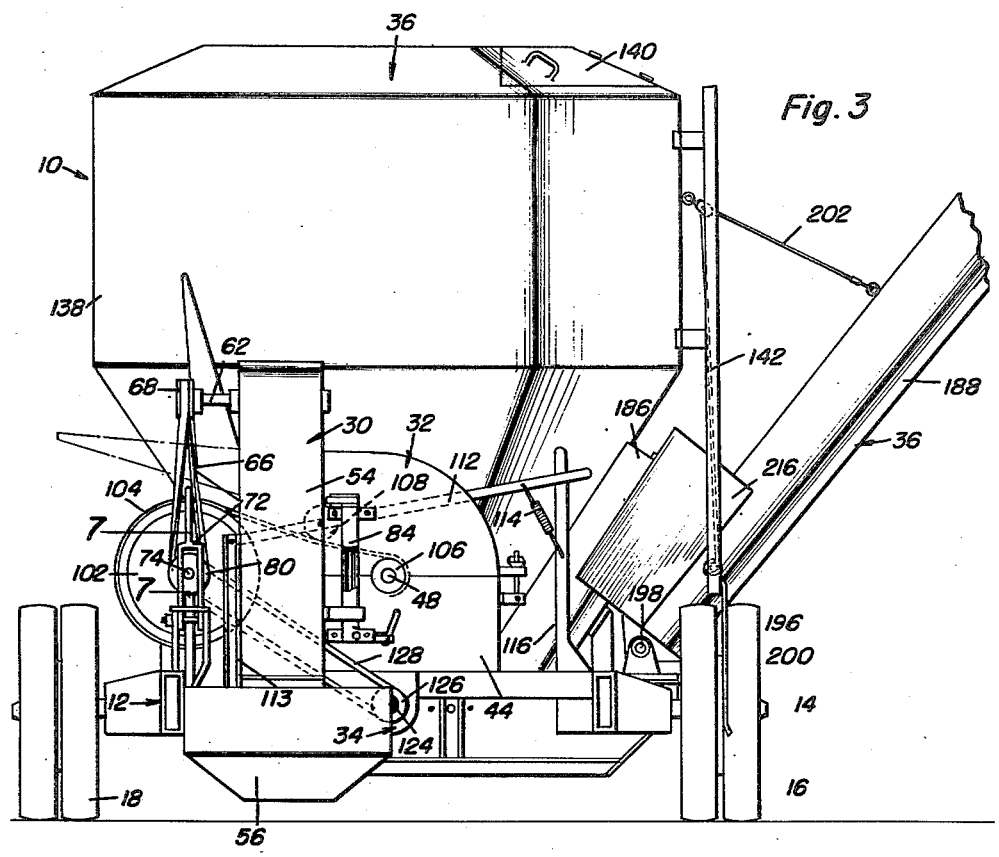
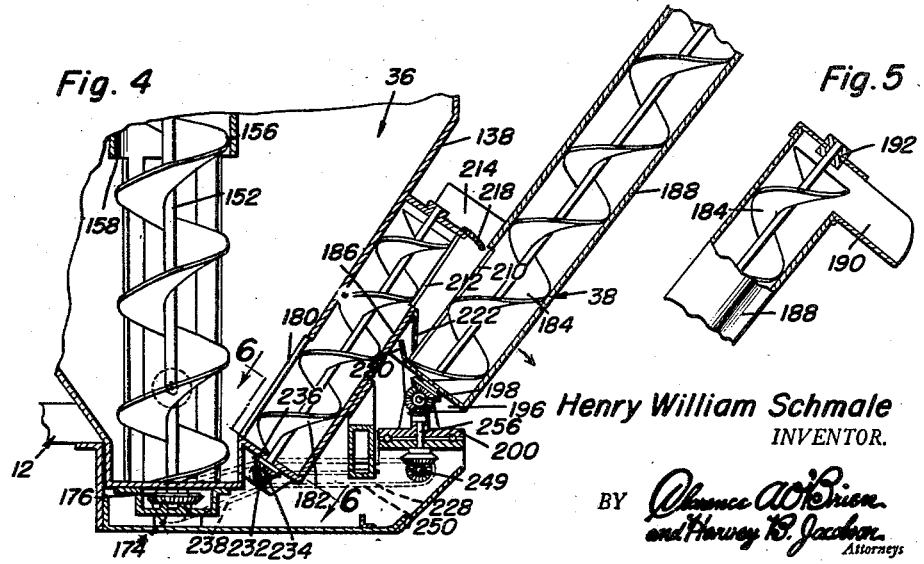
Henry William Schmale
INVENTOR.

United States Patent Office 2,815,941
Patented Dec. 10, 1957

2,815,941

FEED AND GRAIN MIXING MACHINE

Henry William Schmale, Thornton, Iowa

Application July 29, 1955, Serial No. 525,174

2 Claims. (Cl. 259—8)

This invention relates to implements primarily useful on the farm, and particularly to a machine for grinding, mixing, blending and transporting feed grains of all kinds.

The primary object of this invention is to provide a machine which grinds, mixes and blends feed grains of all types useful in various industries, such as livestock, poultry and others, the machine being capable of grinding, mixing and blending at feed sources.

Other objects and features of importance will become apparent in following the description of the form of the invention which is illustrated in the accompanying drawings, wherein:

Figure 2 is a plan view of the machine showing it attached to a part of a tractor from which it derives its motivating power;

Figure 3 is a rear view of the machine;

Figure 4 is an enlarged fragmentary sectional view taken substantially on a line 4—4 of Figure 2 and in the direction of the arrows;

Figure 5 is a fragmentary view showing primarily in section the unloaded discharge end;

Figure 6 is an enlarged fragmentary sectional view showing a clutch arrangement and taken substantially on a line 6—6 of Figure 4 and in the direction of the arrows; and Figure 7 is an enlarged fragmentary sectional view showing another control clutch and taken substantially on a line 7—7 of Figure 3 and in the direction of the arrows.

Figure 1:
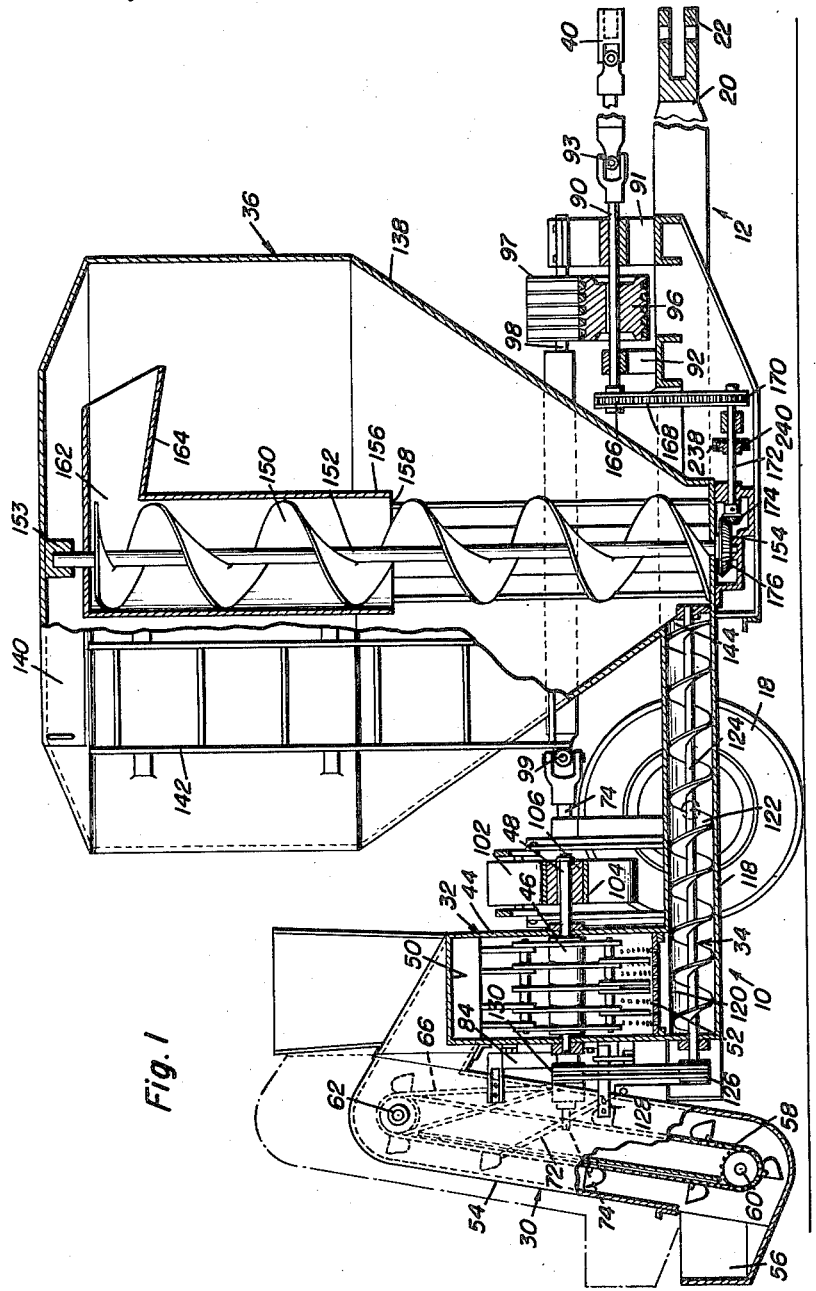
Figure 1 is a longitudinal sectional view of one embodiment of the invention and taken substantially on the line 1—1 of Figure 2 and in the direction of the arrows.

The feed grinding and mixing machine 10 which illustrates the principles of the invention, includes a structural support generally indicate at 12 and having a rear axle 14 on the ends of which are wheels 16 and 18, respectively. The front end of the support 12 is fashioned with a drawbar 20 having a coupling 22 adapted to connect to the tractor drawbar.

At the rear of suport 12 there is a conveyor type loader 30 which empties into a hammermill 32, the latter discharging into a horizontal conveyor 34. Also carried by support 12 and in advance of the hammermill 32, there is a mixing chamber 36, the lower end of which is in communication with conveyor 34. Unloader 38 communicates with the mixing chamber 36 and is adapted to deliver grain taken therefrom to an external structure or on the ground. This is, in essence, the general arrangement of the feed grinding, blending and mixing machine, and it is desired that the power for operating each of these units be delivered from the tractor power take-off 40 (Figure 1). In this way, the machine may be attached to a standard tractor so that it may be moved from one place to another, and the required power for the machine is always readily available.

Hammermill 32 is of standard construction and includes a casing 44 in which rotor 46 is mounted, the rotor having its blades cooperative with the stationary blades and driven by shaft 48. Feed, grain and the like is emptied into the hammermill inlet 50 and after being ground is discharged through the bottom screen 52. Loader 30 comprises a conveyor housing 54 in the lower end of which there is a hopper 56 where the unmixed and unground grain, feed and the like is to be deposited. A slightly inclined bucket-type endless conveyor 58 is mounted on upper and lower shafts 60 and 62 in the housing 54, and each of these shafts has a drive sprocket on it, the upper drive sprocket being the one to which power is delivered through a belt 66 on pulley 68 that is fixed to shaft 62. Actuation of the conveyor 58 is controlled by a clutch 70 (Figure 7), the latter being engaged and disengaged by means of a lever 72 which is suitably pivoted upon support 12.

Clutch 70 is on shaft 74, the latter shaft being rotated by the tractor power take-off through intermediate means. The clutch 70 consists of clutch element 78 rotatably disposed on shaft 74 and having a pulley groove accommodating belt 66. The mating clutch element 80 is splined to shaft 74 and is arranged to be manually pushed into engagement with clutch element 78 by lever 72. The clutch elements are normally held in spaced, disengaging relationship by means of a spring 82 reacting on both clutch elements.

Means are provided for elevating and lowering the loader 30, and the preferred means consist of a hydraulic jack 84 secured to the housing 54 and to a suitable support, as the hammermill casing 44. The jack may be manuarlly operated to raise and lower the housing 54. In so doing, belt 66 would be replaced by one of a larger or smaller dimension. Alternatively, a belt tightener may be used whereby the same belt may remain at all positions of adjustment for the loader 30. The drive for the hammermill rotor 46 is seen best in Figures 1 and 2. From the power take-off 40, shaft 90 which is mounted in suitable bearings 91 and 92 on support 12, is rotated through a universal joint 93. A multiple pulley 96 is spined to shaft 90, and there is another multiple pulley 97 splined or otherwise fixed to shaft 98, the latter being mounted in suitable bearings and extending along one side of the mixing body 36. An appropriate number of belts drivingly connects pulleys 96 and 97, and the shaft 98 through this drive and universal joint 99 rotates the shaft 74 which has been mentioned previously. Between the ends of shaft 74 there is a pulley 102 fixed to it, this pulley having a flat belt 104 around it, the latter being also entrained over a pulley 106 that is fixed to the hammermill rotor drive shaft 48. A belt tightening idler 108 is in contact with belt 104 and is used as a control clutch in order to control the actuation of the hammermill 32. A lever 112 pivoted at one end on a standard 113 carried by support 12 has the idler 84 mounted on it, and a removable spring 114 engageable with lever 112 and another suitable standard 116 on support 12, yieldingly urges the handle 112 in such direction as to bring the idler pulley 108 to bear against the surface of the belt 104. Separation of the idler 108 from the belt 104 permits the belt 104 so that the hammermill is not driven.

The horizontal conveyor 34 consists of an auger casing 118 suitably secured to the support 12 and having an inlet 120 in registry with the hammermill outlet. A screw conveyor 122 is mounted in bearings in the auger casing 118, and the shaft 124 of the screw conveyor 122 protrudes from one end of the auger casing 118. A double pulley 126 is secured to the protruding portion of shaft 124, and double belts 128 are in engagement therewith. These belts also engage a double pulley 130 which is keyed or otherwise fixed to shaft 74 (Figure 7) whereby the auger 124 derives its operating power from the shaft 74.

Mixing chamber 36 consists of a hopper 138 having an access door 140 at the top of it and a ladder 142 welded or otherwise fixed to the side thereof. The lower end of the body 36 has a feed and grain inlet opening 144 in which a part of the auger 122 is operable. Accordingly, the ground grain, feed and the like which is delivered from the hammermill enters the mixing chamber body at the lower part thereof. Additional grains and the like may be emptied into the access door 140 at the top of the body 36.

Means for mixing the contents of the mixing body 36 are disposed in the body. They consist of a mixing auger 150 mounted approximately vertically by its auger shaft 152 in an upper bearing 153 and a lower bearing 154. This mixing auger 150 is disposed in a housing 156, the lower end of which has an opening 158 in registry with the lower end of hopper 138 in order to provide an entrance for the contents of the mixing body. Housing 156 is mounted by any suitable supports in a generally vertical position in hopper 138. The upper end of the housing 156 has a discharge opening 162 around which there is a deflection hood 164. In order to actuate the mixing auger 150, shaft 90 is provided with a sprocket 166 around which chain 168 is entrained. This chain drives another sprocket 170 which is fixed to shaft 172, the latter being mounted in bearings on support 12 and having a pinion 174 secured to it. This pinion is enmeshed with a gear 176 fixed to auger shaft 152 whereby the auger shaft is rotated at the same time that shaft 90 rotates through the tractor power take-off.

For unloading the mixing body 36, there is a discharge opening 180 near the bottom thereof and adjacent to the auger housing 156. Unloader 38 consists of two screw conveyors 182 and 184 respectively, conveyor 182 being in a fixed housing 186 on body 138, while conveyor 184 is disposed in a movable housing 188. Housing 188 has a discharge spout 190 at the upper end thereof near the bearing 192 for the screw conveyor 184. The lower end of the housing 188 has mounting brackets 196 depending therefrom (Figures 3 and 4) which are mounted for rotation on the shaft 198. This shaft is carried by the rotatable portion of a turntable 200, the latter being carried by support 12. Accordingly, the housing 188 is capable of tilting about the shaft 198 as an axis and also capable of rotation about an axis perpendicular to shaft 198 together with turntable 200. Suitable means, such as a rope 202 is fastened to the housing 188 and extends around pulleys in order to lower and lift the housing 198 and hold it in the selected position of adjustment.

The lower end of housing 188 has an entrance opening 210 in it which communicates with the discharge opening 212 of housing 186. Side baffles 214 and 216 secured to one of the screw conveyor housings guide the mixed material from the housng 186 to the housing 188. In order to prevent the mixed material from being lost when the housing 188 is tilted, upper and lower baffles 218 and 220 are secured respectively to the housings 186 and 188, and a hinged baffle 222 is used at the lower part of housing 188 whereby it may be hingedly moved by baffle 220 when necessary due to the adjustment of housing 188.

The actuation of the screw conveyors 182 and 184 is controlled by a clutch lever 228 which displaces clutch element 230 on the splined shaft 232. This shaft 232 has a pinion 234 fixed to it which is enmeshed with a gear 236, the latter being fixed to the shaft of the screw conveyor 182. Inasmuch as there is a drive chain 238 drivingly connecting shaft 232 with shaft 172 through sprockets 240 and 242, the shaft 232 is rotated when the clutch element 230 is engaged with clutch element 244 fixed to sprocket 242. Actuation of handle 228 serves the purpose of bringing the clutch elements 230 and 244 into engagement.

In order to actuate conveyor 184, the shaft 198 is rotated by rotation of shaft 249 which is set in motion by chain 250 that is connected by a sprocket thereto and to the shaft 232 by means of sprocket 252 formed on the clutch element 230. A shaft 256 having gears at both ends and passing through the axis of rotation of turntable 200, drivingly connects shaft 198 to the shaft 249, and the shaft 198 is geared by means of bevel gearing to the shaft of the screw conveyor 184.

In operation, the grain and other matter to be treated is deposited in the hopper portion 56 of the loader 30. The conveyor 58 therein elevates it and spills the same into the hammermill 32. The hammermill discharges this material into the conveyor 34 and which transports it to the bottom part of the mixing body 36 at the opening 158 which serves as the inlet for the mixing auger housing 156. As the auger rotates, it draws the material in the mixing body 36 into the bottom of the housing 136 and elevates it, discharging it through upper opening 162 into the top part of the mixing body 36. After the material is thoroughly mixed, and while the mixing operation is in progress, some of the material is accepted into the unloader 38 by passing through the opening 180 and entering the conveyor casing 186. From here, it is discharged into the conveyor housing 188 for ultimate discharge through the spout 190 thereof.

The foregoing is considered as illustrative only of the principles of the invention. Further, since numerous modifications and charges will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a grain mixing machine that has a mobile frame which supports a longitudinal approximately horizontally disposed conveyor, a mixing body having tapered sidewalls which are funneled downwardly and inwardly, one of said sidewalls at the lower portion thereof having an inlet in registry with said conveyor, one of said side walls of said mixing body having an aperture, means operatively connected with said body for withdrawing grain therefrom, said withdrawing means comprising unloading augers, housings having openings, said unloading augers being operable in said housings, means mounting one of said housings with its opening in alignment with said aperture in said wall, the other of said housings having its opening in registry with another opening in the first mentioned housing, means mounting said other housing for adjustment relative to said mixing body, a mixing auger disposed approximately vertically in said mixing body and having a generally vertical axis of rotation, a mixing auger casing in which said mixing auger is disposed, said casing having an inlet at the lower part thereof and located in the tapered wall part of said body to accept grain from the lower part of said mixing body and transport it upwardly in said body, said auger casing having an outlet near the top thereof to spill the grain into the top portion of said mixing body so that it is continuously circulated in said mixing body in response to rotation of said mixing auger after which the grain may be withdrawn by said grain withdrawing means.

2. The grain mixing machine of claim 1 together with means adapted to be connected to a tractor power take-off for actuating the conveyor and each of said augers, and means operatively connected with said actuating means to render operable a selected auger.

References Cited in the file of this patent

UNITED STATES PATENTS

| 1,720,360 | Haines | July 9, 1929 |
| 1,770,552 | Robb | July 15, 1930 |
| 1,985,888 | Day | Jan. 1, 1935 |
| 2,222,380 | Statler | Nov. 19, 1940 |
| 2,297,867 | Berg | Oct. 6, 1942 |
| 2,517,456 | Wherrett | Aug. 1, 1950 |
| 2,546,747 | Herr | Mar. 27, 1951 |
| 2,557,344 | Erickson | June 19, 1951 |